United States Patent
Yano

(10) Patent No.: US 9,488,366 B2
(45) Date of Patent: Nov. 8, 2016

(54) LIGHT EMISSION DEVICE FOR IMAGING APPARATUS

(71) Applicant: CANON KABUSHIKI KAISHA, Tokyo (JP)

(72) Inventor: Hiroshi Yano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 242 days.

(21) Appl. No.: 13/791,438

(22) Filed: Mar. 8, 2013

(65) Prior Publication Data

US 2013/0242525 A1 Sep. 19, 2013

(30) Foreign Application Priority Data

| Mar. 13, 2012 | (JP) | 2012-056016 |
| Mar. 13, 2012 | (JP) | 2012-056017 |
| Mar. 13, 2012 | (JP) | 2012-056018 |
| Mar. 13, 2012 | (JP) | 2012-056019 |

(51) Int. Cl.

| *G03B 15/02* | (2006.01) |
| *F21V 15/00* | (2015.01) |
| *F21V 21/00* | (2006.01) |
| *F21V 33/00* | (2006.01) |
| *G03B 15/05* | (2006.01) |

(52) U.S. Cl.
CPC ............ *F21V 33/0052* (2013.01); *G03B 15/05* (2013.01); *G03B 2215/0517* (2013.01); *G03B 2217/007* (2013.01)

(58) Field of Classification Search
CPC ............ H01M 2/1055; H01M 2/0434; G03B 2215/0517; G03B 15/05; G03B 2217/007; F21L 4/00; F21L 4/04; F21L 4/027; F21Y 2101/02; F21V 19/00; F21V 19/001; F21V 23/023; F21V 33/0052
USPC ............................................ 362/157, 8, 9, 11
See application file for complete search history.

(56) References Cited

U.S. PATENT DOCUMENTS 2,911,809 A * 11/1959 Tatuo Nojiri ................. 396/203
3,629,793 A * 12/1971 Ettischer ............. H01M 2/1044
362/157

(Continued)

FOREIGN PATENT DOCUMENTS

| CN | 2076246 U | 5/1991 |
| JP | S55-040462 A | 3/1980 |

(Continued)

*Primary Examiner* — Y M Lee
*Assistant Examiner* — Erin Kryukova
(74) *Attorney, Agent, or Firm* — Canon USA, Inc. I.P. Division

(57) ABSTRACT

A light emission device attachable and detachable to and from an imaging apparatus, includes: a light emission portion; a storage portion for accommodating a battery which supplies electric power to cause the light emission portion to emit light; and a capacitor which accumulates electrical energy to cause the light emission portion to emit light using the power supplied from the battery, wherein the storage portion is arranged such that the longitudinal direction of the battery accommodated in the storage portion is substantially perpendicular to the longitudinal direction of the light emission portion, the capacitor is arranged such that the longitudinal direction of the capacitor is substantially perpendicular to the longitudinal direction of the light emission portion, and the storage portion and the capacitor are arranged side by side in the longitudinal direction of the light emission portion.

4 Claims, 12 Drawing Sheets

(56) References Cited

U.S. PATENT DOCUMENTS

| | | | |
|---|---|---|---|
| 4,078,240 A * | 3/1978 | Kaneko et al. | 396/159 |
| 4,260,231 A * | 4/1981 | Kawarada | 396/203 |
| 4,271,376 A * | 6/1981 | Kawazoe | 315/241 P |
| 4,371,594 A * | 2/1983 | Ohara et al. | 429/97 |
| 5,003,330 A * | 3/1991 | Kotani et al. | 396/176 |
| 5,007,859 A * | 4/1991 | Sangregory | H01M 2/1055 439/500 |
| 5,930,534 A * | 7/1999 | Stephenson, III | 396/178 |
| 2003/0185553 A1* | 10/2003 | Kameyama et al. | 396/206 |
| 2008/0063928 A1* | 3/2008 | Lin | 429/97 |
| 2010/0040946 A1* | 2/2010 | Tsuji | H01M 2/1055 429/175 |
| 2010/0062324 A1* | 3/2010 | Ooyama | H01M 2/0404 429/97 |
| 2012/0211254 A1* | 8/2012 | Miura | 174/50 |

FOREIGN PATENT DOCUMENTS

| | | |
|---|---|---|
| JP | S56-051730 A | 5/1981 |
| JP | S61-171099 A | 8/1986 |
| JP | H10-079884 A | 3/1998 |
| JP | 2001-142118 A | 5/2001 |
| JP | 2001-350185 A | 12/2001 |
| JP | 2004-020887 A | 1/2004 |
| JP | 2007-212928 A | 8/2007 |
| JP | 2010-026263 A | 2/2010 |
| JP | 2010-033074 A | 2/2010 |
| JP | 2010-181552 A | 8/2010 |
| JP | 2011-018050 A | 1/2011 |
| JP | 2011-159877 A | 8/2011 |

* cited by examiner

ILLUMINATION OPTICAL AXIS

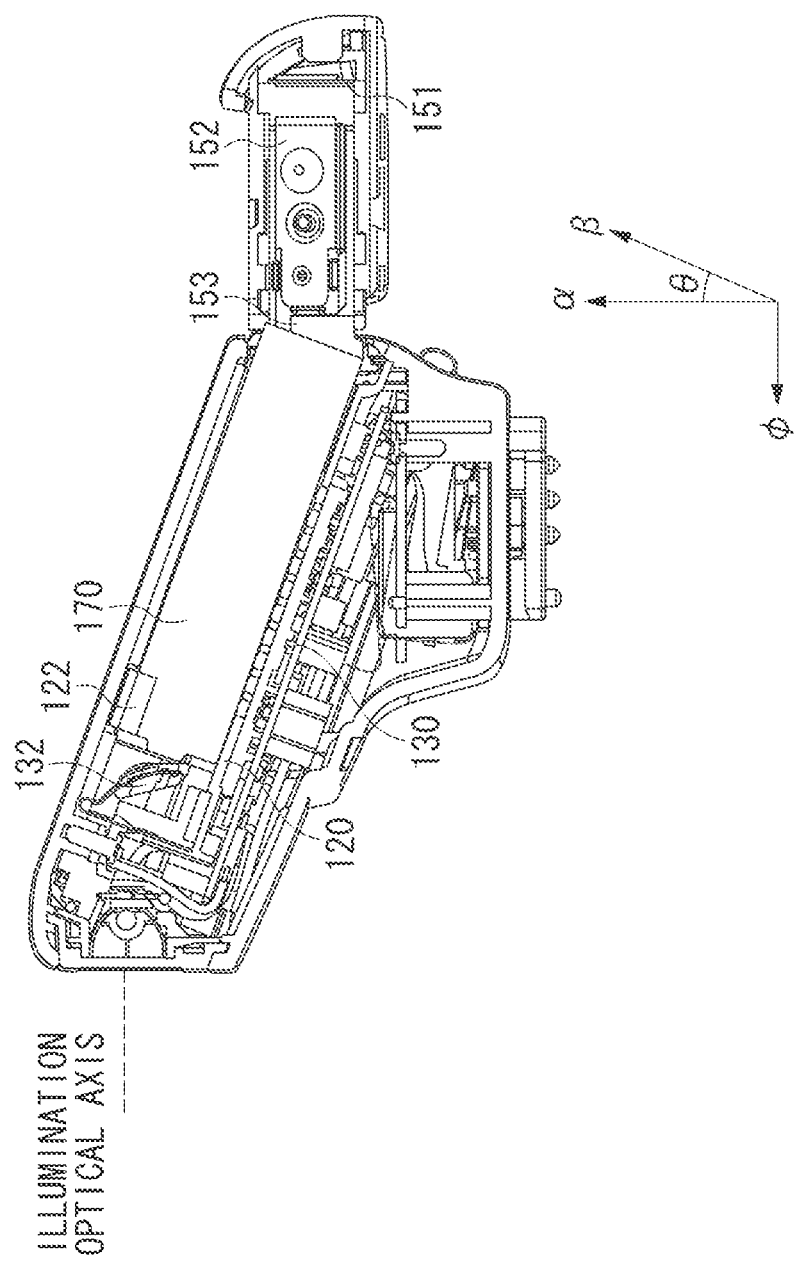

LIGHT EMISSION DEVICE FOR IMAGING APPARATUS

BACKGROUND OF THE INVENTION

1. Field of the Invention

The present invention relates to a light emission device attachable and detachable to and from an imaging apparatus.

2. Description of the Related Art

In recent years, a reduction in size is required of a light emission device attachable and detachable to and from an imaging apparatus such as a digital camera in order to achieve an improvement in terms of portability. Under such a situation, Japanese Patent Application Laid-Open No. 2010-181552 discusses a technique which makes it possible to efficiently arrange an electrical component without requiring an unnecessary space within the main body of a flash device (a light emission device).

However, in the technique discussed in Japanese Patent Application Laid-Open No. 2010-181552, a battery and a capacitor are arranged such that their longitudinal direction is the lateral direction (horizontal direction) of the device main body. As a result, it is impossible for the lateral width (horizontal width) of the device main body to be smaller than the longitudinal size of the battery and the capacitor, so that it is difficult to achieve a reduction in the size of the flash device despite the effort to eliminate a useless space within the device main body.

SUMMARY OF THE INVENTION

The present invention is directed to a small-sized light emission device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a longitudinal sectional view of the light emission device according to the exemplary embodiment, with a cover opened.

DESCRIPTION OF THE EMBODIMENTS

Various exemplary embodiments, features, and aspects of the invention will be described in detail below with reference to the drawings.

Figure 1A:
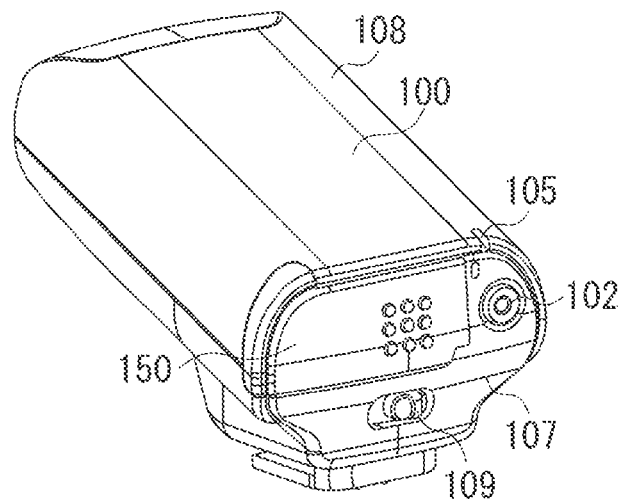
FIGS. 1A, 1B, and 1C are overall views illustrating a light emission device according to an exemplary embodiment.
Figure 1B:
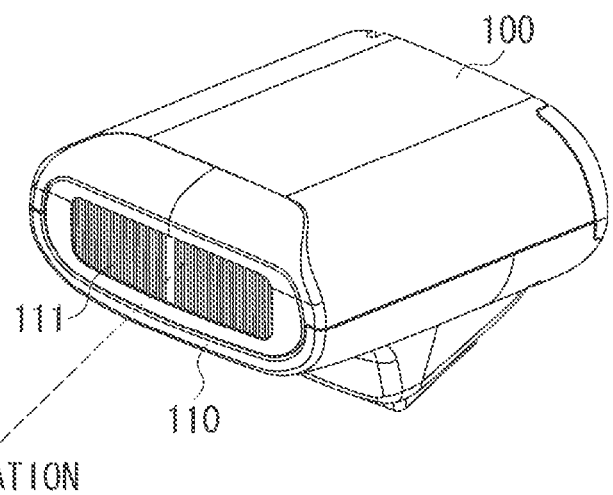
Figure 1C:
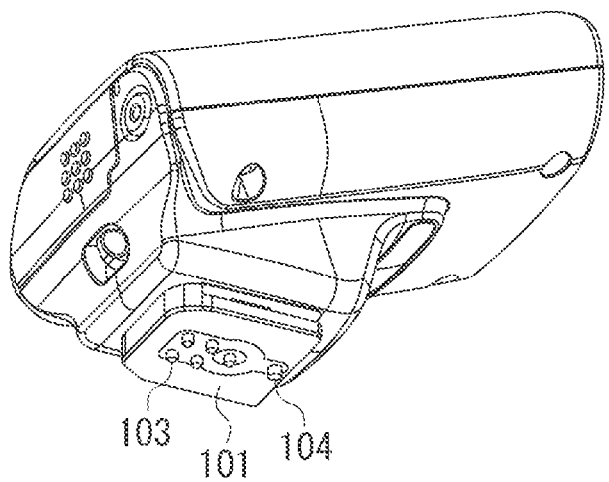

FIGS. 1A, 1B, and 1C are overall views of a flash device attachable and detachable to and from an imaging apparatus. FIG. 1A is a perspective view, as seen from the rear side and from below, of a flash device, FIG. 1B is a perspective view of the same as seen from the front side and from above, and FIG. 1C is a perspective view of the same as seen from the rear side and from below.

The flash device includes a device main body 100, a light emission portion 110 arranged on the front side of the main body 100, a connection portion 101 arranged on the lower side (bottom side) of the main body 100 and electrically connected to a terminal of the imaging apparatus.

Further, on the rear side (back side) of the main body 100, a power switch 102 for starting the flash device, an informing portion 105 using an LED or the like and configured to inform the user of information such as the recharging state of a main capacitor 131 described below, and a cover portion 150 of a storage portion 120 storing a battery 170 are provided.

Further, on the rear side of the main body 100, a lock lever 109 is provided, which keeps the flash device attached and fixed to the imaging apparatus so that it may not be inadvertently detached from the imaging apparatus.

Furthermore, the light emission portion 110 has an optical panel 111 serving as a window through which light is emitted from the light source, the connection portion 101 and a lock claw 104. The connection portion 101 has a contact portion 103 for performing communication with the imaging apparatus and a lock claw 104 is configured to move vertically in conjunction with the movement of the lock lever 109. The surface of the connection portion 101 from which the contact portion 103 and the lock claw 104 protrude is facing the terminal portion of the imaging apparatus 200. Further, the flash device has a lower cover portion 107 and an upper cover portion 108 as exterior portions.

Figure 2:
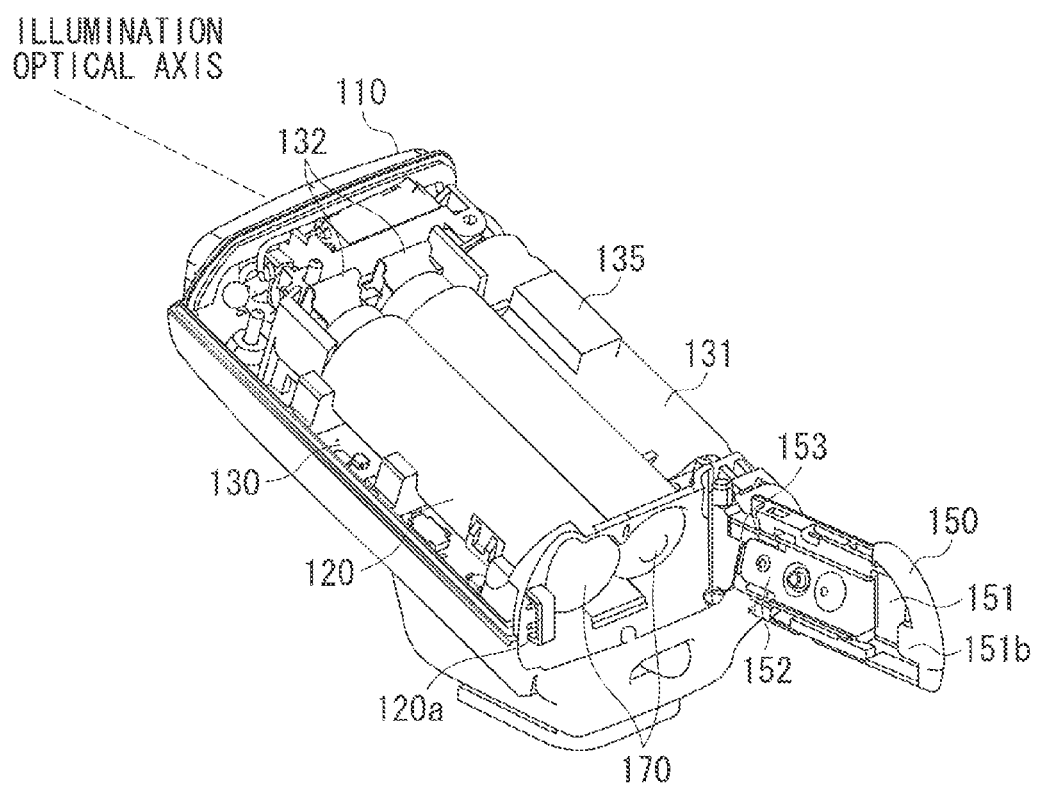
FIG. 2 is a diagram illustrating the internal structure of the light emission device according to the exemplary embodiment.

Next, the internal structure of the flash device will be described with reference to FIG. 2. FIG. 2 illustrates a state in which the upper cover portion 108 has been removed from the flash device as illustrated in FIG. 1A, with the cover portion 150 opened. In the main body 100, the storage portion 120 accommodating the batteries 170 for supplying electric power to cause the light emission portion 110 to emit light is arranged on the rear side of the light emission portion 110.

Further, on the rear side of the light emission portion 110, a main capacitor 131 configured to accumulate (charge) the electric energy for causing the light emission portion 110 to emit light by using the electric power supplied from the batteries 170 is arranged. The storage portion 120 and the main capacitor 131 are arranged such that their longitudinal direction is substantially perpendicular to the longitudinal direction of the light emission portion 110. The expression: "substantially perpendicular" covers not only the case in which they are completely perpendicular but also the case in which they are inclined to a degree regarded as perpendicular.

The longitudinal direction of the storage portion 120 is a direction corresponding to the longitudinal direction of the batteries 170. The storage portion 120 and the main capacitor 131 are arranged side by side in the longitudinal direction of the light emission portion 110.

On the rear side of the storage portion 120 the cover portion 150 configured to open and close the rear side end of the storage portion 120 is arranged. By opening the cover portion 150, it is possible to insert and extract the batteries into and from the storage portion 120 out of the rear side of the flash device The cover portion 150 has a cover portion 151 constituting the exterior portion, a claw portion 151b fit-engaged with a claw receiving portion 120a formed in the vicinity of the opening of the storage portion 120, and a cover side contact portion 152 configured to be electrically connected with the batteries 170 accommodated in the storage portion 120 when the cover portion 150 is closed. Further, the cover portion 150 is retained by a hinge portion 153 so as to be rotatable relative to the main body 100.

Under the storage portion 120 and the main capacitor 131, a main board 130 is arranged, on which a control circuit for controlling the light emission of the light emission portion, etc. are arranged. Further, on the main board 130, battery terminal portions 132 electrically connected to the batteries 170, a light intensity control sensor 116 described below, etc are mounted.

A power switch 102 as an operating member, and an informing portion 105 configured to supply information on the state of the flash device are arranged on the rear side of the main capacitor 131 (on the rear side of the main capacitor and on the main capacitor side of the cover portion 150). The power switch 102 is arranged side by side with the main capacitor 131 in the longitudinal direction of the main capacitor 131 and is arranged side by side with the cover portion 150 in the longitudinal direction of the light emission portion 110.

The rear side of the main capacitor 131 where the power switch 102 and the informing portion 105 are arranged is not overlapping with the cover portion 150. Thus, despite the structure allowing insertion and extraction of the batteries from the rear side of the flash device, the size of the flash device is not increased, and it is possible to arrange the power switch 102 at a position where it can be easily operated by the photographer when the flash device is attached to the imaging apparatus. Further, it is possible to arrange the informing portion 105 at a position where it is easily visible for the photographer when the flash device is attached to the imaging apparatus.

The operating member may be other than the power switch 102. It may also be a member for adjusting the light emission amount of the flash device or a member for setting the operation mode of the flash device. Further, the operating member may be of a type other than the depression type like the power switch 102. It may also be a slide type or a dial type member.

Figure 3A:
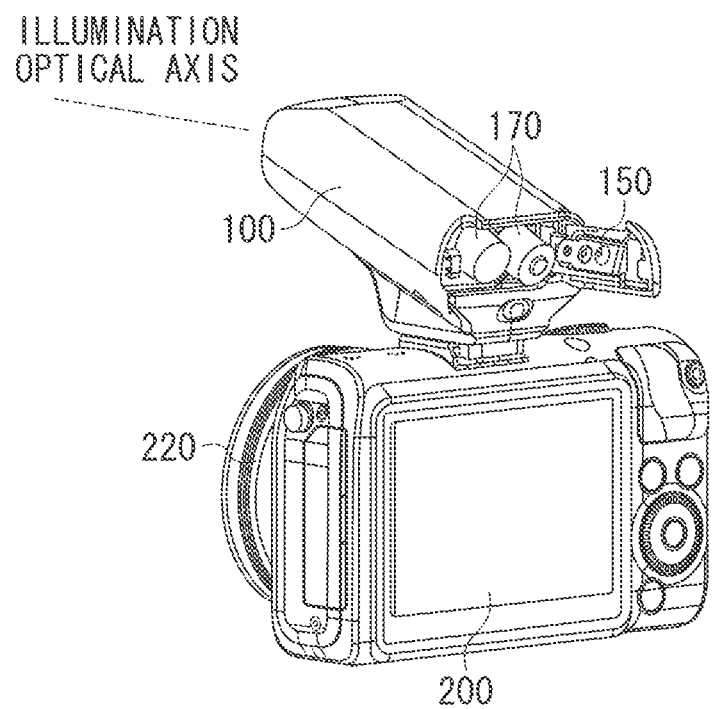
FIGS. 3A and 3B are diagrams illustrating the light emission device according to the exemplary embodiment as attached to an imaging apparatus.
Figure 3B:
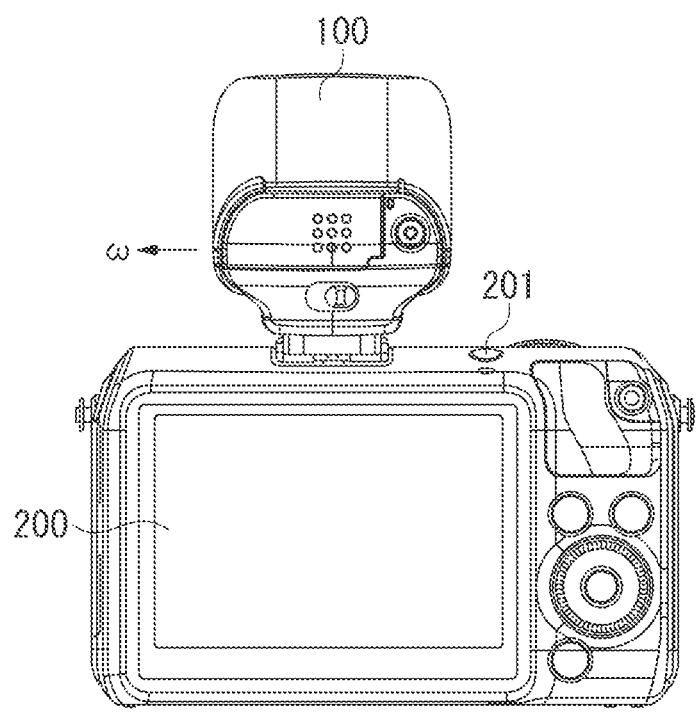

FIGS. 3A and 3B illustrate the state in which the flash device as illustrated in FIGS. 1 and 2 has been attached to the imaging apparatus 200. By arranging each portion as described above, it is possible to make the lateral width (horizontal width) of the flash device smaller than the longitudinal length of the batteries 170. Thus, the area of the surface of the flash device facing the upper surface of the imaging apparatus 200 is reduced, and the flash device constitutes no obstacle when operating a switch 201 provided on the upper surface of the imaging apparatus 200.

Further, when using the flash device which has been attached to the imaging apparatus 200 as illustrated in FIGS. 3A and 3B, it is desirable that the light emission portion 110 of the flash device is arranged such that the illumination light from the flash device is not intercepted by a lens portion 220 of the imaging apparatus 200. For, if the illumination light from the flash device is intercepted by the lens portion 220 of the imaging apparatus 200, a captured image becomes partially darkened, or the shadow of the lens portion 220 is projected on the picture.

However, to achieve a reduction in the size of the flash device, it is desirable for the distance between the light emission portion 110 and the connection portion 101 to be as small as possible. If the light emission portion 110 of the flash device is disposed excessively away from the lens portion 220 of the imaging apparatus 200, the illumination range of the illumination light from the flash device and the shooting range are greatly deviated from each other, making it impossible to sufficiently apply the illumination light from the flash device to the portion around a photographing range.

Accordingly, in the present exemplary embodiment, the storage portion 120 and the main capacitor 131 are inclined relative to the illumination optical axis of the light emission portion 110 such that, in the longitudinal direction, one end (the front side end of the flash device) is situated at an upper level than the other end (the rear side end of the flash device). That is, the storage portion 120 is arranged such that the longitudinal direction of the batteries 170 accommodated in the storage portion 120 is inclined relative to the surface of the connection portion 101 facing the terminal portion of the imaging apparatus 200.

Further, the storage portion 120 is arranged such that the end near the light emission portion 110 in the longitudinal direction of the batteries 170 accommodated in the storage portion 120 is disposed further away from the plane including the surface facing the terminal portion of the imaging apparatus 200 than the end distant from the light emission portion 110 in the longitudinal direction of the batteries 170.

Further, the main capacitor 131 is arranged such that the longitudinal direction of the main capacitor 131 is inclined relative to the surface of the connection portion 101 facing the terminal portion of the imaging apparatus 200. Further, the main capacitor 131 is arranged such that the end near the light emission portion 110 in the longitudinal direction of the main capacitor 131 is disposed further away from the plane including the surface facing the terminal portion of the imaging apparatus 200 than the end distant from the light emission portion 110 in the longitudinal direction of the main capacitor 131.

Further, the light emission portion 110 protrudes further forwardly than the connection portion 101. Due to this construction, the light emission portion 110 arranged in front of the front end of the storage portion 120 and the main capacitor 131 can be efficiently disposed away from the connection portion 101 arranged below the rear end of the storage portion 120 and the main capacitor 131. Thus, while suppressing an increase in the size of the flash device, it is possible to arrange the light emission portion 110 at a position where the illumination light from the flash device is not blocked by the lens portion 220 of the imaging apparatus 200 and where it is possible to sufficiently apply the illumination light from the flash device to the peripheral portion of the photographing range.

When the lens portion 220 of the imaging apparatus 200 is very long in the optical axis direction as in the case of an ultra-telephoto lens, the illumination light from the flash device is blocked by the lens portion 220 of the imaging apparatus 200 even in the construction as described above. However, in the case where shooting is performed by using an ultra-telephoto lens, it is presumed that an object is present at so distant position, so that the illumination light from the flash device is prevented from reaching the object. Thus, in the present exemplary embodiment, the lens portion 220 of the imaging apparatus 200 which is very long in the optical axis direction as in the case of an ultra-telephoto lens is not taken into account.

When the longitudinal direction of the storage portion 120 and the main capacitor 131 is inclined as described above, the following problem occurs: By sliding the cover portion 150 in the direction ω from the position illustrated in FIG. 3B, the cover portion 150, which has been locked in the closed state, is released, and it becomes possible to insert and extract the batteries 170 as illustrated in FIG. 3B. In the state illustrated in FIG. 3A, the direction in which the batteries 170 are extracted from the storage portion 120 becomes obliquely downward by inclining the longitudinal direction of the storage portion 120 relative to the illumination optical axis of the light emission portion 110. Thus, depending upon the inclination of the longitudinal direction of the storage portion 120, the batteries 170 that have been stored might fall from the storage portion 120 under their own weight when the cover portion 150 is opened.

Accordingly, an elastic member 122 described below is provided to contact the batteries 170 stored in the storage portion 120, so that the batteries 170 can be prevented from being detached and fall from the storage portion 120, owing to their frictional contact with the elastic member 122.

Figure 4A:
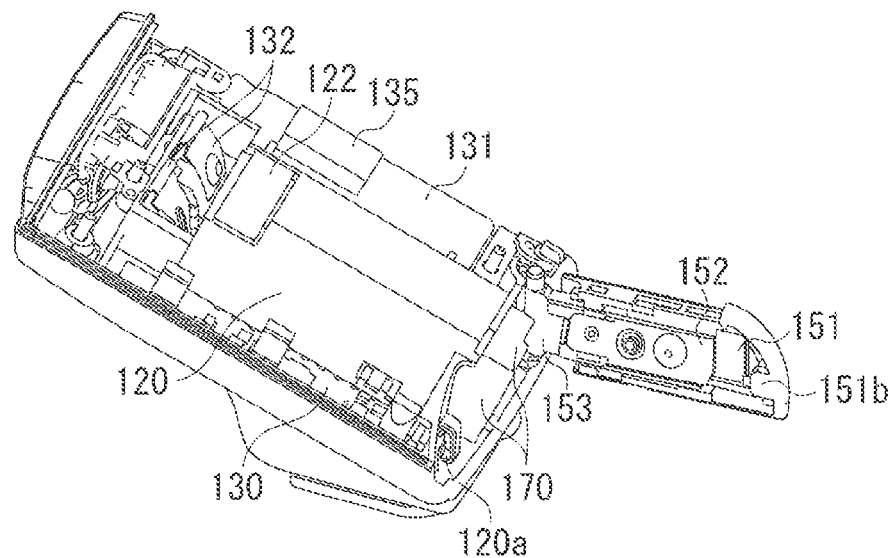
FIGS. 4A and 4B are diagrams illustrating in detail the internal structure of the light emission device according to the exemplary embodiment.
Figure 4B:
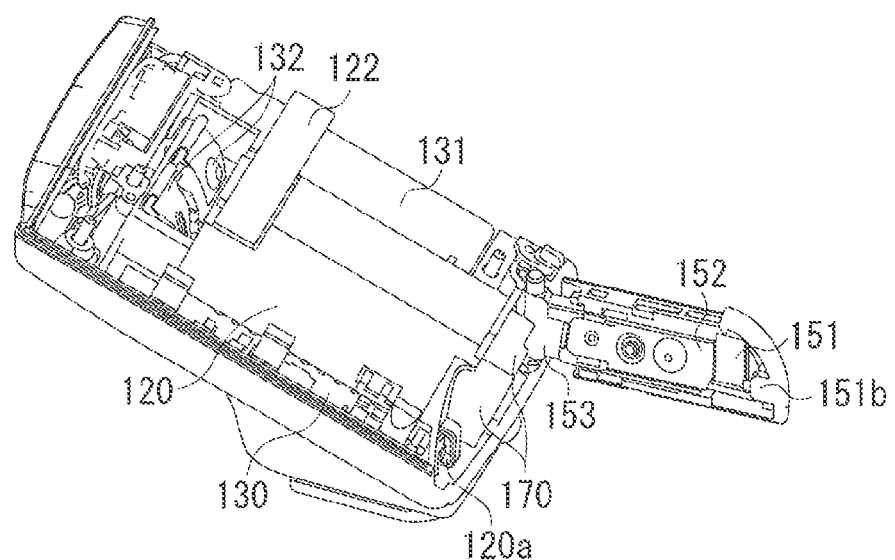

FIGS. 4A and 4B are detailed perspective views of the internal structure of the flash device. The elastic member 122 formed of sponge, rubber or the like is attached to the upper cover portion 108, and a portion thereof is exposed to the inside of the storage portion 120.

To prevent the batteries 170 from being be detached and falling from the storage portion 120 under their own weight, the elastic member 122 adjusts the force (frictional force) applied to the batteries 170 in the direction in which the batteries 170 are inserted into the storage portion 120, with the exposure amount to the storage portion 120, the elastic force, etc.

Further, in FIG. 4A, a buffer member 135 used to prevent the main capacitor 131 from being destroyed by a shock applied when, for example, the flash device drops, is also attached to the upper cover portion 108 together with the elastic member 122. Thus, as illustrated in FIG. 4B, if the elastic member 122 extends between the main capacitor 131 and the upper cover portion 108, and the elastic member functions also as the buffer member 135 illustrated in FIG. 4A, a reduction in the number of components can be achieved.

Battery terminals 132 provided in the vicinity of the front end in the longitudinal direction of the storage portion 120 have a spring structure configured to apply a force to the batteries 170 accommodated in the storage portion 120 in a direction of extracting the batteries 170 from the storage portion 120. In the state in which the cover portion 150 is closed, the battery terminals 132 constantly apply a force to the contact portions of the batteries 170.

As illustrated in FIG. 5, at least a part of the elastic member 122 abuts the batteries 170 at a position closer to the cover portion 150 than the distal end of the spring structure of the battery terminal portions 132. That is, the elastic member 122 is arranged at a position where it applies a force in a direction the batteries 170 are inserted into the storage portion 120, to the batteries 170 accommodated in the storage portion 120 situated where no force is applied from the battery terminal portions 132.

The force (urging force) applied to the batteries 170 from the battery terminal portions 132 in a direction the batteries 170 are extracted from the storage portion 120, is larger than the frictional force applied to the batteries 170 from the elastic member 122.

Thus, it is possible to push the batteries 170 out of the storage portion 120 according to the displacement amount of the spring structure of the battery terminal portion 132, and the user can easily extract the batteries 170 from the storage portion 120 by grasping the batteries 170 slightly pushed out of the storage portion 120. Further, even if a part of the batteries 170 is pushed out of the storage portion 120 by the urging force of the battery terminal portion 132, the batteries 170 can be prevented from being detached and dropping under its own weight owing to the frictional force of the elastic member 122.

Figure 6:
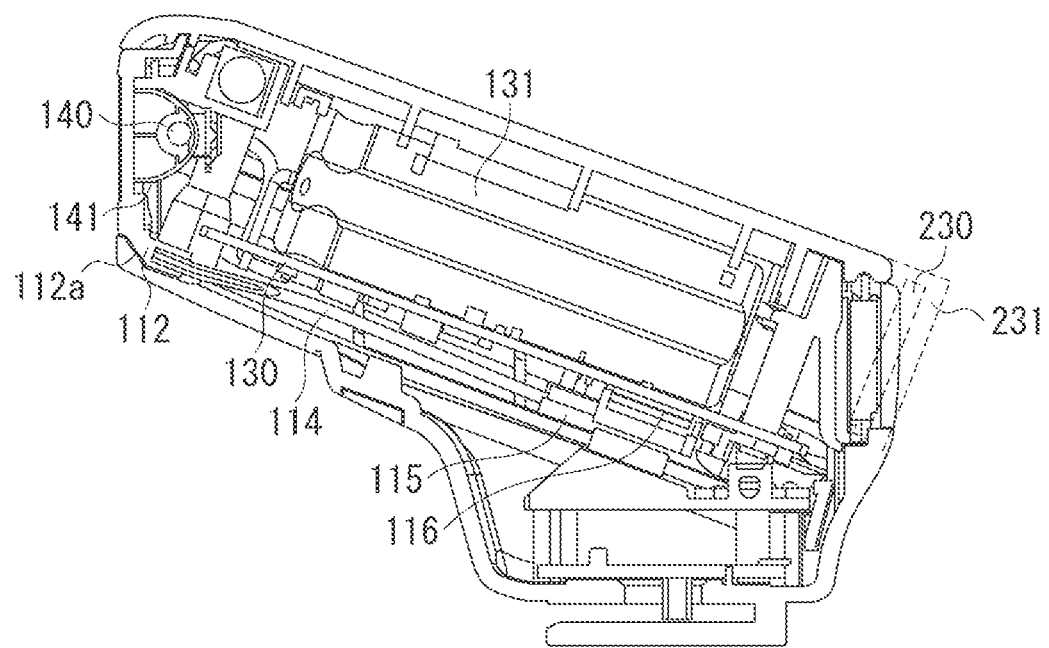
FIG. 6 is a longitudinal sectional view of the light emission device according to the exemplary embodiment, with the cover portion thereof closed.
Figure 8:
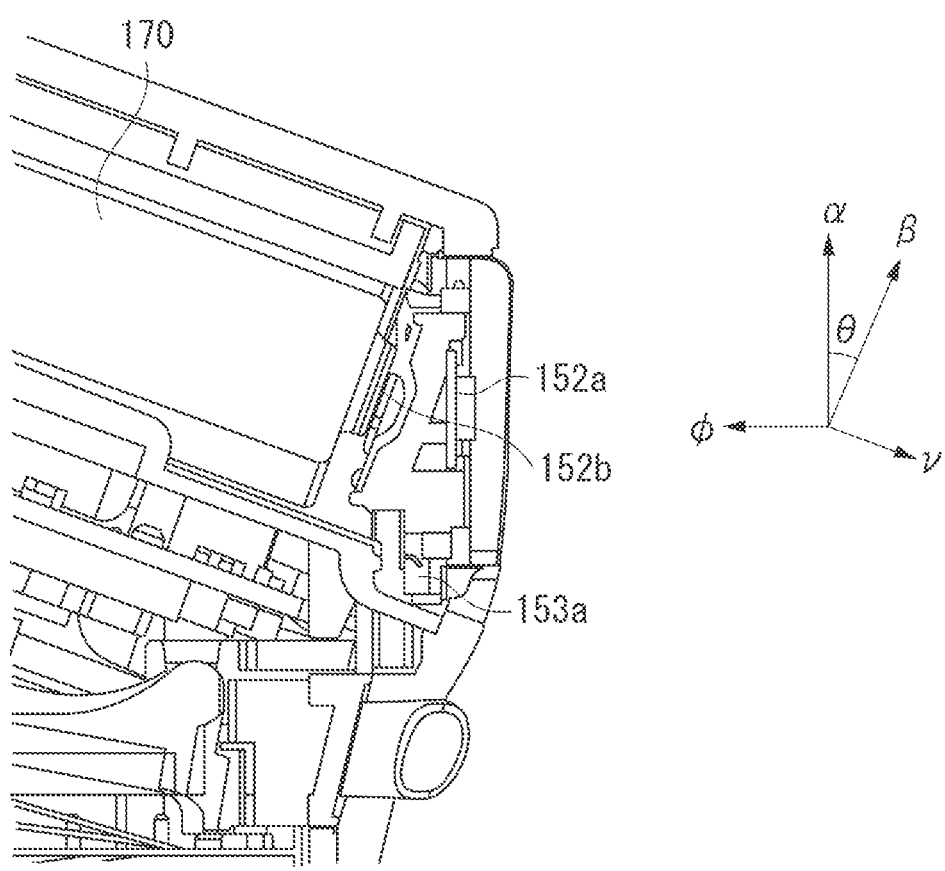
FIG. 8 is an enlarged longitudinal sectional view of the light emission device according to the exemplary embodiment, illustrating the portion around the cover portion thereof.
Figure 9:
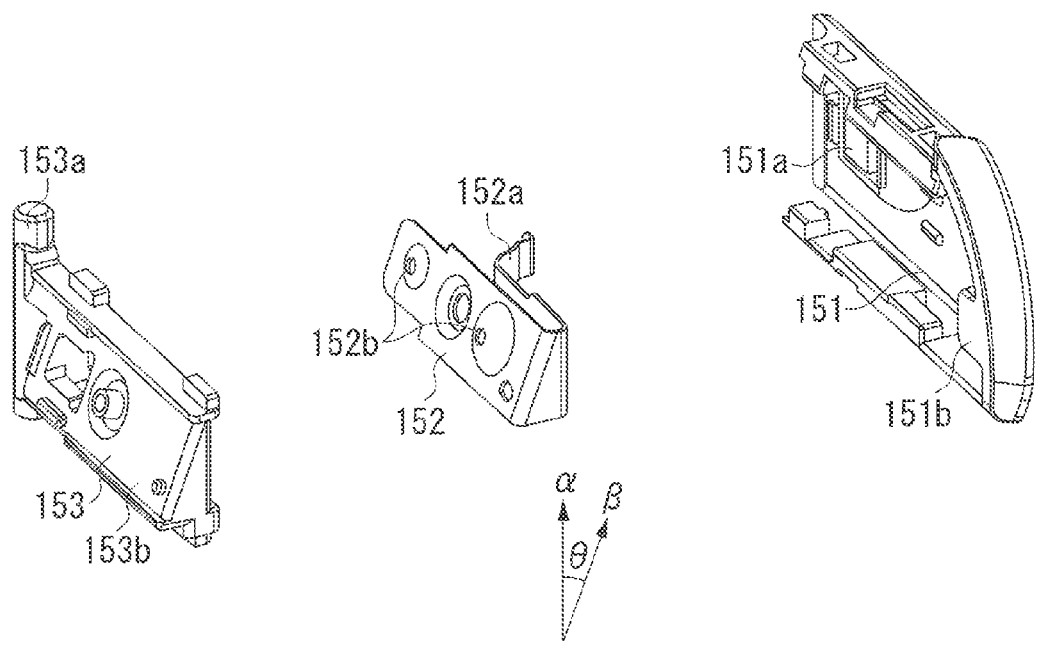
FIG. 9 is an exploded perspective view of the cover portion of the light emission device according to the exemplary embodiment.

Next, the structure of the cover portion 140 will be described with reference to FIGS. 6 through 9. FIG. 6 is a longitudinal sectional view of the flash device according to the present exemplary embodiment, with the cover portion 150 closed, FIG. 7 is a diagram illustrating a method of opening and closing the cover portion 150, FIG. 8 is an enlarged longitudinal sectional view of the portion around the cover portion 150, and FIG. 9 is an exploded perspective view of the cover portion 150.

In the flash device as discussed in Japanese Patent Application Laid-Open No. 2010-181552, the direction in which the batteries are inserted and extracted is lateral relative to the flash device main body. Further, the rotation axis of the battery cover, which covers the battery storage portion accommodating the batteries, extends in a direction perpendicular to the direction in which the batteries are inserted and extracted. This structure is employed for the purpose of establishing a satisfactory conduction between the batteries urged by a battery intercept provided inside the battery storage portion and the contact portion provided inside the battery cover substantially parallel to the battery cover.

On the other hand, in the flash device according to the present exemplary embodiment, the direction in which the batteries 170 are inserted and extracted is oblique relative to the main body 100. Thus, if the axial direction of the rotation shaft of the cover portion 150 is supposed to be perpendicular to the direction in which the batteries 170 are inserted and extracted as in the case of the flash device discussed in Japanese Patent Application Laid-Open No. 2010-181552, a rotation shaft portion 230 will be inclined relative to the main body 100 as indicated by the dashed line of FIG. 6. However, as indicated by the dashed line of FIG. 6, if the rotation shaft portion 230 is inclined relative to the main body 100, a shaft holding portion 231 provided on the upper cover portion 108 to support the rotation shaft portion 230 extends to the rear side of the main body 100, resulting in an increase in the size of the flash device.

In the state in which the illumination optical axis of the light emission portion 110 is parallel to the ground by inclining the rotation shaft portion 230 relative to the main body 100, it is necessary, when closing the open cover portion 150, to slide the cover portion 150 in the direction ω to lock the same while applying an upward force to the cover portion 150. Thus, it is difficult to lock the cover portion 150, with the illumination optical axis of the light emission portion 110 parallel to the ground.

Further, it is necessary to shape the lower cover portion 107 to be in conformity with the oblique rotation of the cover portion 150, so that the releasing direction of the lower cover portion 107 becomes rather complicated.

In the flash device according to the present exemplary embodiment, a satisfactory electrical continuity is attained between the batteries 170 and the cover side contact portion 152 without inclining the rotation shaft of the cover portion 150 relative to the main body 100.

Figure 7A:
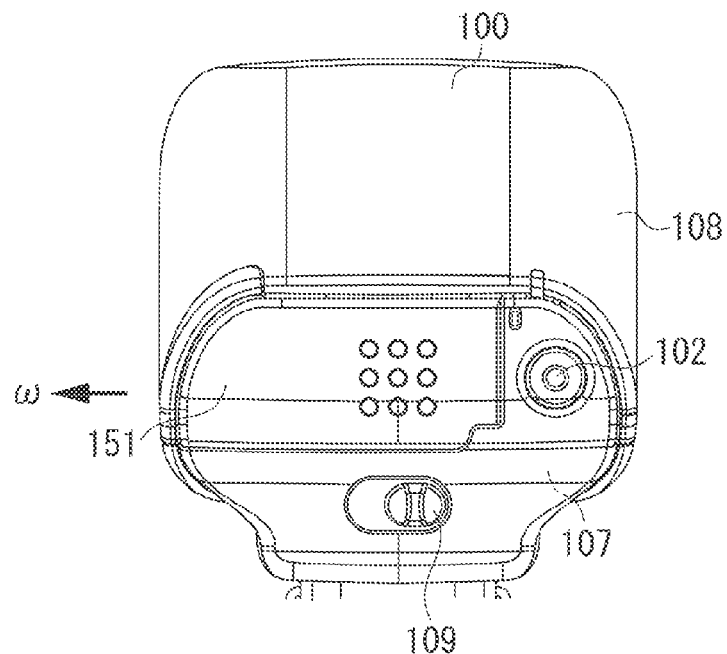
FIGS. 7A and 7B are diagrams illustrating how the cover portion of the light emission device is opened and closed.

As illustrated in FIG. 7A, the cover member 151 can move in the direction ω (a radial direction of the rotation shaft of the cover portion 150), which is a direction substantially perpendicular to the illumination optical axis of the light emission portion 110 and is lateral relative to the main body 100.

Figure 7B:
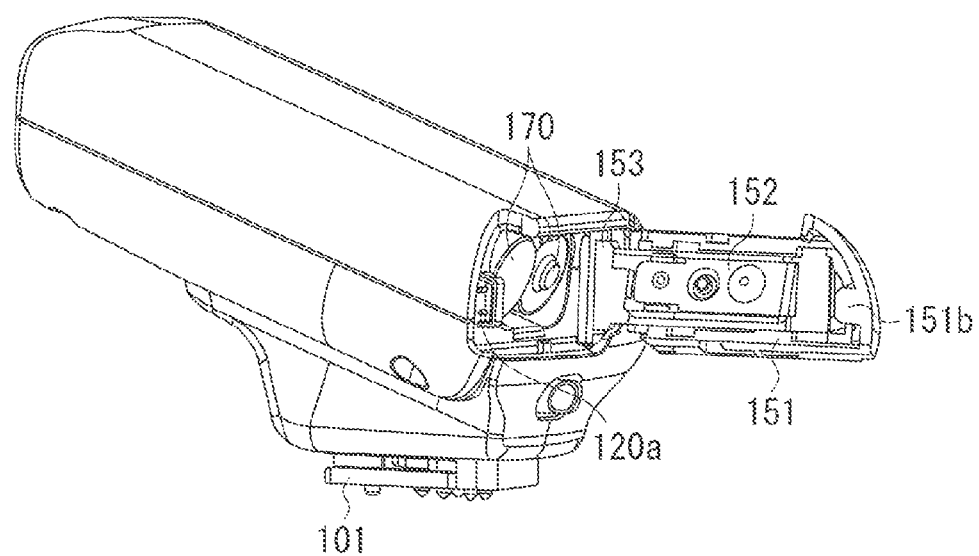

When the cover portion 150 is moved in the direction ω, the cover portion 150, which has been in the state where a claw portion 151*b* and a claw receiving portion 120*a* are fit-engaged with each other, enters the state where the claw portion 151*b* and the claw receiving portion 120*a* are disengaged from each other, making the cover portion 150 rotatable. Then, the cover portion 150 can be opened around the rotation shaft extending in a direction substantially perpendicular to the illumination optical axis of the light emission portion 110 and substantially parallel to the longitudinal direction (vertical direction) of the flash device, exposing the storage portion 120 as illustrated in FIG. 7B.

As illustrated in FIG. 8, in the state in which the cover portion 150 is closed, a spring click portion 152*a* of a cover side contact portion 152 applies a force in a direction ø, which is substantially perpendicular to the illumination optical axis of the light emission portion 110. The direction ø is a direction substantially perpendicular to the axial direction of the rotation shaft of the cover portion 150.

The spring click portion 152*a* generates a clicky feeling with a click receiving portion 151*a* provided in the cover portion 151 illustrated in FIG. 9 when the cover portion 151 is locked or unlocked (when it is moved in a direction substantially parallel to the longitudinal direction of the light emission portion 110).

Further, the cover side contact portion 152 has a battery contact portion 152*b* on a surface extending in a direction β which is substantially perpendicular to the direction γ in which the batteries 170 are inserted and extracted (the longitudinal direction of the storage portion 120). In this way, in the state in which the cover portion 150 is closed, the cover side contact portion 152 and the contact portions of the batteries 170 are electrically connected to provide a satisfactory conduction.

The battery contact portion 152*b* and the spring click portion 152*a* are inclined by an angle θ which is substantially the same angle by which the storage portion 120 is inclined relative to the illumination optical axis of the light emission portion 110. That is, while the spring click portion 152*a* and the battery contact portion 152*b* are formed on the same member, one is provided on a surface substantially parallel to the axial direction of the rotation shaft, and the other is provided on a surface substantially perpendicular to a direction corresponding to the longitudinal direction of the batteries 170 of the storage portion 120.

The hinge portion 153 has a cover rotation shaft portion 153*a* constituting the rotation center of the cover portion 150, and the axial direction thereof is a direction α which is substantially perpendicular to the illumination optical axis of the light emission portion 110 and substantially parallel to the longitudinal direction of the flash device. That is, the cover portion 150 rotates around the rotation shaft substantially perpendicular to the surface of the connection portion 101 facing the terminal portion of the imaging apparatus 200 to open and close the storage portion 120.

Further, the hinge portion 153 is inclined by the inclination angle θ similar to the battery contact portion 152*b* of the cover side contact portion 152, and has a battery receiving portion 153*b* configured to receive the batteries 170 accommodated in the storage portion 120 when the cover is closed.

Owing to the above-described structure of the cover portion 150, even if the direction in which the batteries 170 are inserted and extracted is inclined relative to the main body 100, it is possible to easily open and close the cover portion 150 without increasing the size of the flash device. Further, when the cover portion 150 is closed, it is possible to provide a satisfactory conduction between the batteries 170 accommodated in the storage portion 120 and the cover side contact portion 152.

Further, when the batteries 170 are accommodated in the storage portion 120 and the cover 150 is closed, the battery contact portion 152*b* abuts on the contact portions of the batteries 170, and then pushes the batteries 170 obliquely upwards. That is, the cover portion 150 is closed while the battery contact portion 152*b* is rubbing the contact portions of the batteries 170. Through this movement, it is possible to remove dust or the like between the contact portions of the battery 170 and the battery contact portion 152*b*, which enhances the contact stability between the contact portions of the batteries 170 and the battery contact portion 152*b*.

Figure 10A:
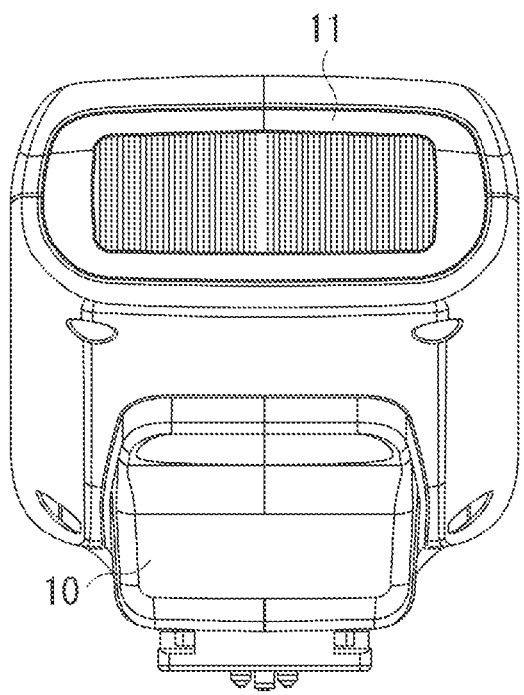
FIGS. 10A and 10B are diagrams illustrating the light emission device according to the exemplary embodiment as seen from the front side.
Figure 10B:
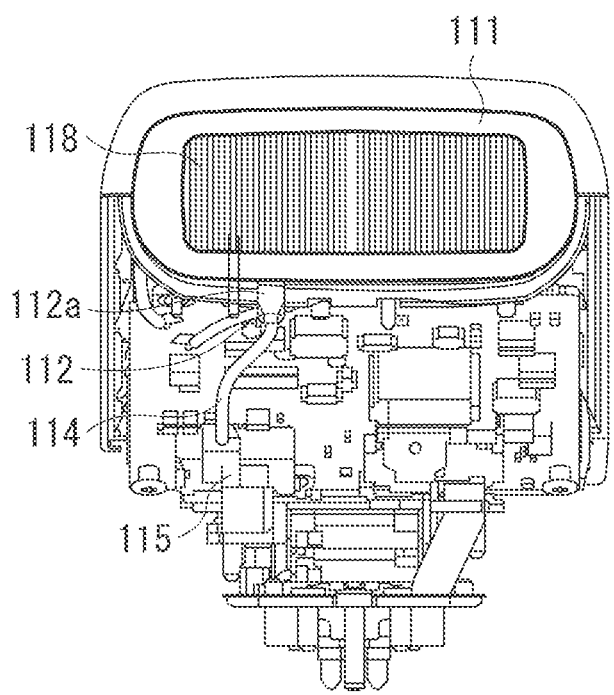
Figure 11:
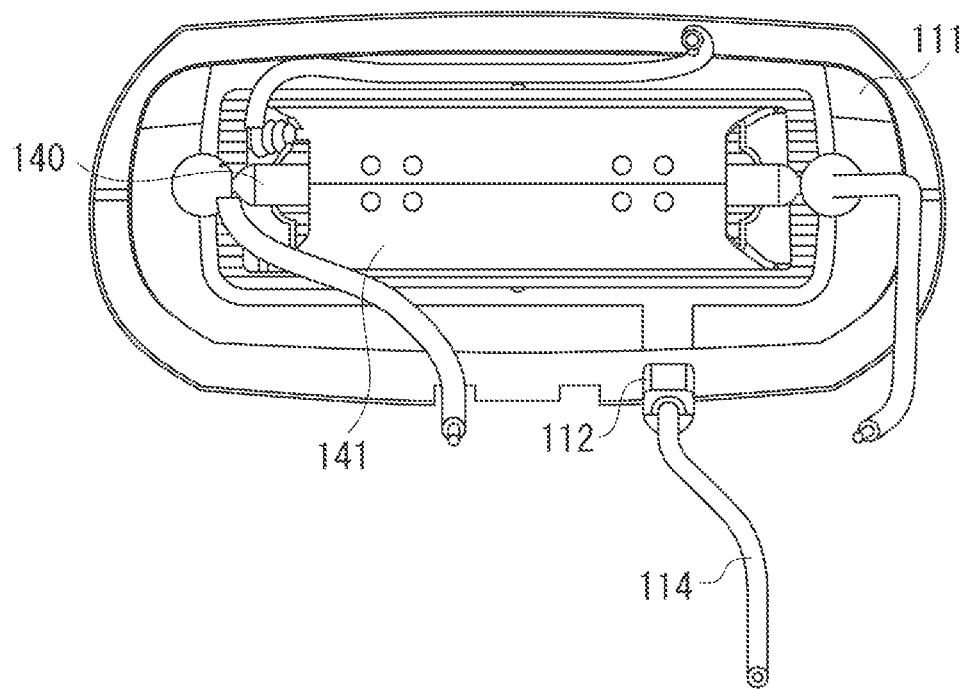
FIG. 11 is a rear view of a light emission portion of the light emission device according to the exemplary embodiment.
Figure 12:
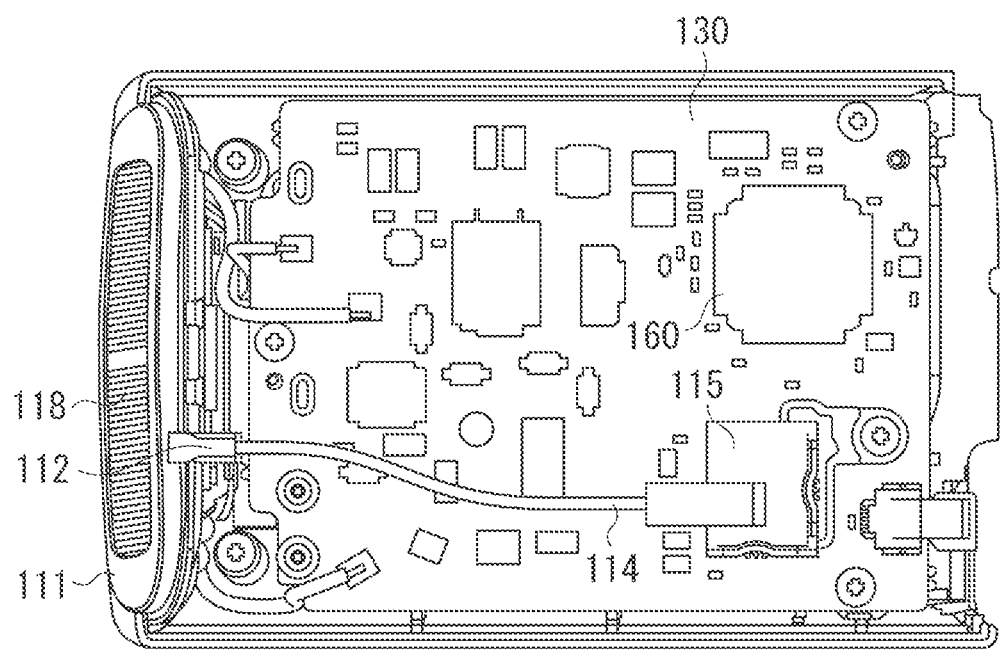
FIG. 12 is a bottom view of the interior of the main body of the light emission device according to the present exemplary embodiment.

Next, the structure of the light emission portion 110 will be described with reference to FIGS. 6 and 10 through 12. FIG. 10 is a front view of the flash device according to the present exemplary embodiment, FIG. 11 is a rearview of the light emission portion 110, and FIG. 12 is a bottom view of the interior of the main body 100.

In a conventional flash device, light emitted from a light source is guided to a light reception sensor via a light guide member such as an optical fiber. When the light amount received by the light reception sensor attains a target value, the light emission from the light source is stopped, so that it is possible to accurately control the light emission amount.

For example, Japanese Patent Application Laid-Open 2011-159877 discusses a camera in which an optical fiber insertion hole is provided in a side surface of a Fresnel lens of a flash panel of a flash light emission portion, and flash light is guided to a light intensity control sensor via an optical fiber inserted into the optical fiber insertion hole. If such an optical fiber insertion hole is visible from the outside, the outward appearance of the camera becomes unsightly, so that the optical fiber insertion hole is covered with an exterior cover or the like, making the optical fiber insertion hole hard to see from the outside.

However, in the above-described structure, in which the optical fiber insertion hole is provided in the side surface of the Fresnel lens of the flash panel, the width in the lateral direction of the flash light emission portion becomes larger.

Accordingly, the flash device according to the present exemplary embodiment employs a structure allowing accurate control of the light emission amount without increasing the lateral width of the light emission portion 110.

As illustrated in FIG. 6, the light emission portion 110 has a discharge tube 140 serving as the light source, an optical panel 111 which is an optical member arranged on the front side of the discharge tube 140, and a reflector 141 reflecting the light emitted from the discharge tube 140 in the direction of the optical panel 111.

Further, on the optical panel 111, a light guide portion 112 for guiding the light emitted from the discharge tube 140 to a light intensity control sensor 116 and a Fresnel portion 118 are provided. The light intensity control sensor 116 serves as the light receiving portion and is mounted on the main board 130. The Fresnel portion 118 serves as an ejection portion that ejects the light emitted from the discharge tube 140 in a diffused state.

A control circuit 160 mounted on the main board 130 performs light emission control of the discharge tube 140 based on the light reception result of the light intensity control sensor 116. The main board 130 is arranged under the storage portion 120 and extends along the storage portion 120. That is, the main board 130 is provided such that its front end in the front-to-rear direction of the flash device is situated above its rear end.

One end of the light guide member 114 such as an optical fiber is fixed to the light guide portion 112, and the other end of the light guide member 114 is fixed to a light intensity control sensor cover 115. The light intensity control sensor cover 115, which is a cover member covering the light intensity control sensor 116, serves to cause the light guided through the light guide member 114 to efficiently enter the light intensity control sensor 116, and also serves to prevent the external light not guided through the light guide member 114 from entering the light intensity control sensor 116.

The light guide portion 112 is provided on the lower surface portion of the optical panel 111, and extends in a direction substantially parallel to the longitudinal direction of the storage portion 120. That is, the light guide portion 112 extends toward the rear side of the flash device so as to be substantially parallel to the main board 130. Thus, the incident surface of the light guide member 114 fixed to the light guide portion 112 is also inclined relative to the illumination optical axis of the light emission portion 110, so that a reflection surface 112a can efficiently reflect the light emitted from the discharge tube 140 toward the incident surface of the light guide member 114.

Further, as illustrated in FIG. 12, the light guide portion 112 extends toward the light intensity control sensor 116, and can connect the light guide portion 112 and the light intensity control sensor 116, by using the light guide member 114 which is substantially straight, thus making it possible to enhance the light guide efficiency of the light guide member 114.

On the portion of the main board 130 directly below the route through which the light guide member 114 passes, a component of large mounting height, a component attaining high temperature, a pattern which can be adversely affected by the noise from the light guide member 114, etc cannot be installed. Thus, there is a limitation to the layout of the components mounted on the main board 130 depending on the route through which the light guide member 114 passes. However, by connecting the light guide portion 112 and the light intensity control sensor 116, using the light guide member 114 which is substantially straight, it is possible to mitigate the layout limitation on the main board 130.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2012-056016 filed Mar. 13, 2012, No. 2012-056017 filed Mar. 13, 2012, No. 2012-056018 filed Mar. 13, 2012, and No. 2012-056019 filed Mar. 13, 2012, which are hereby incorporated by reference herein in their entirety.

What is claimed is:

1. A light emission device attachable and detachable to and from an imaging apparatus, comprising:
    a light emission portion;
    a storage portion for accommodating a battery supplying electric power for causing the light emission portion to emit light;
    a cover portion for opening and closing the storage portion;
    a connection portion electrically connected to a terminal portion of the imaging apparatus to which the light emission device is attached; and
    a contact portion electrically connected to the battery accommodated in the storage portion when the cover portion is closed,
    wherein the storage portion is arranged such that one end of the battery accommodated in the storage portion in a longitudinal direction is further away from a plane including a surface of the connection portion facing the terminal portion of the imaging apparatus to which the light emission device is attached than the other end of the battery in the longitudinal direction,
    wherein the cover portion and the storage portion are arranged side by side in the longitudinal direction of the battery accommodated in the storage portion,
    wherein the cover portion opens and closes the storage portion by rotating around a rotation shaft substantially perpendicular to the surface of the connection portion facing the terminal portion, and
    wherein the contact portion is provided on a surface which is inclined to the rotation shaft by an angle substantially the same as an inclination angle of the storage portion to the surface of the connection portion facing the terminal portion.

2. The light emission device according to claim 1, wherein the surface on which the contact portion is provided is substantially perpendicular to the longitudinal direction of the battery accommodated in the storage portion when the cover portion is closed.

3. The light emission device according to claim 1, wherein the cover portion has a claw portion configured to lock the cover portion in the closed state by fit-engaging with a claw receiving portion provided in the vicinity of an opening of the storage portion, and
    wherein the claw portion is placed in a state in which it is fit-engaged with the claw receiving portion or in a state in which it is disengaged from the claw receiving portion by moving the cover portion in a direction perpendicular to the rotation shaft.

4. The light emission device according to claim 1, further comprising:
    an elastic member configured to apply a force to the battery accommodated in the storage portion in a direction inclined to the surface of the connection portion facing the terminal portion.

* * * * *